United States Patent [19]
Oracz et al.

[11] Patent Number: 4,936,347
[45] Date of Patent: Jun. 26, 1990

[54] FAUCET ACTUATOR

[75] Inventors: Stephen J. Oracz; Bennett L. VanderGriend, both of Grand Rapids, Mich.; James E. Doyle, Grandville, Mich.

[73] Assignee: Suspa, Incorporated, Grand Rapids, Mich.

[21] Appl. No.: 421,778

[22] Filed: Oct. 16, 1989

[51] Int. Cl.⁵ .................. F16K 11/078; F16K 31/72
[52] U.S. Cl. ........................ 137/625.17; 137/625.4; 251/54
[58] Field of Search ............... 137/625.17, 625.4; 251/48, 54; 188/316

[56] References Cited

U.S. PATENT DOCUMENTS

| | | | |
|---|---|---|---|
| 557,292 | 3/1896 | Turner | 251/48 |
| 570,306 | 10/1896 | Turner | 251/54 |
| 859,371 | 7/1907 | Coyle | 251/54 |
| 1,063,230 | 6/1913 | Watrous | 251/54 |
| 1,580,494 | 4/1926 | Jones | 251/54 |
| 2,022,791 | 12/1935 | Tetlow | 251/48 |
| 2,528,822 | 11/1950 | Dunn | 251/54 |
| 2,557,287 | 6/1951 | Hormann | 251/54 |
| 2,829,859 | 4/1958 | Joyslen | 251/54 |
| 2,963,259 | 12/1960 | Heyer et al. | 251/48 |
| 3,102,711 | 9/1963 | Filliung | 251/54 |
| 4,165,857 | 8/1979 | Morris et al. | 251/54 |
| 4,495,969 | 1/1985 | Givler | 137/625.17 |
| 4,723,574 | 2/1988 | Bergmann | 137/625.17 |

*Primary Examiner*—John Rivell
*Attorney, Agent, or Firm*—Price, Heneveld, Cooper, DeWitt & Litton

[57] ABSTRACT

A slow closing faucet assembly having hot and cold water inlets, a spool valve capable of rectilinear movement for controlling water flow volume and rotational movement for controlling relative amounts of hot and cold water, a tubular housing mounted on the faucet, a hydraulic damper in the tubular housing having an extended piston rod attached to a valve stem of the spool valve, a compression coil spring around the hydraulic damper between an upper retainer and a lower retainer, the upper retainer being threadably attached to the housing, and adjustable to vary the spring compression, the lower retainer being rectilinearly movable within the housing toward the upper retainer to compress the spring and hydraulic damper, and a lever having an end within said housing engaged with the valve stem for rotation thereof allowing water temperature control, and operable on said lower retainer for moving said lower retainer toward said upper retainer.

21 Claims, 2 Drawing Sheets

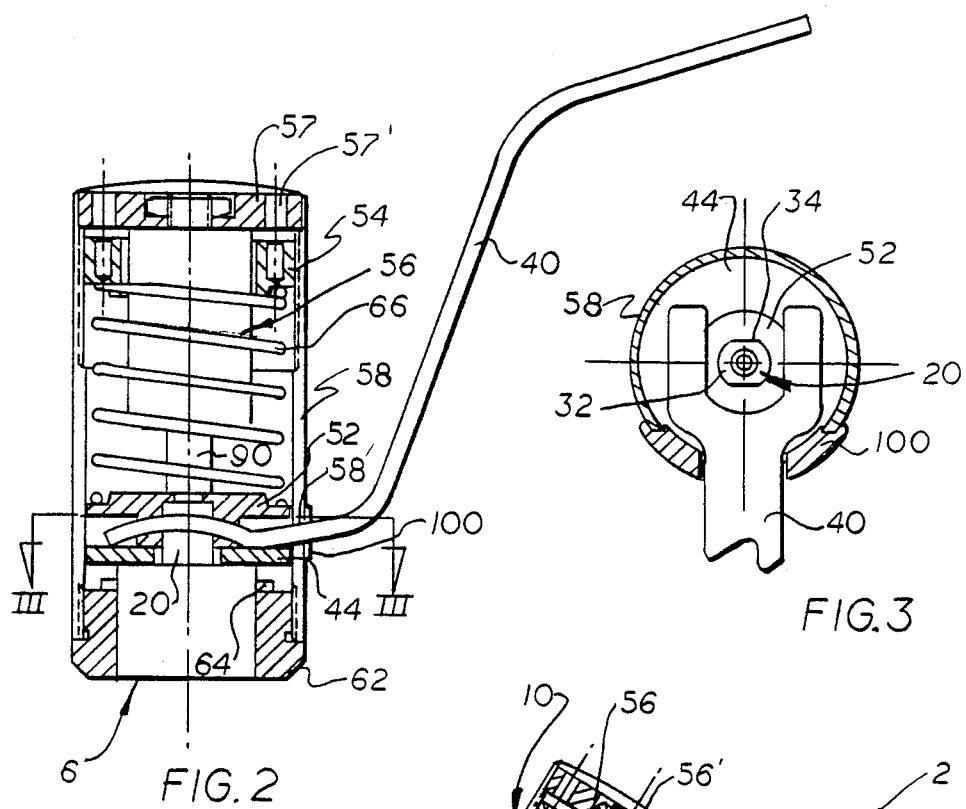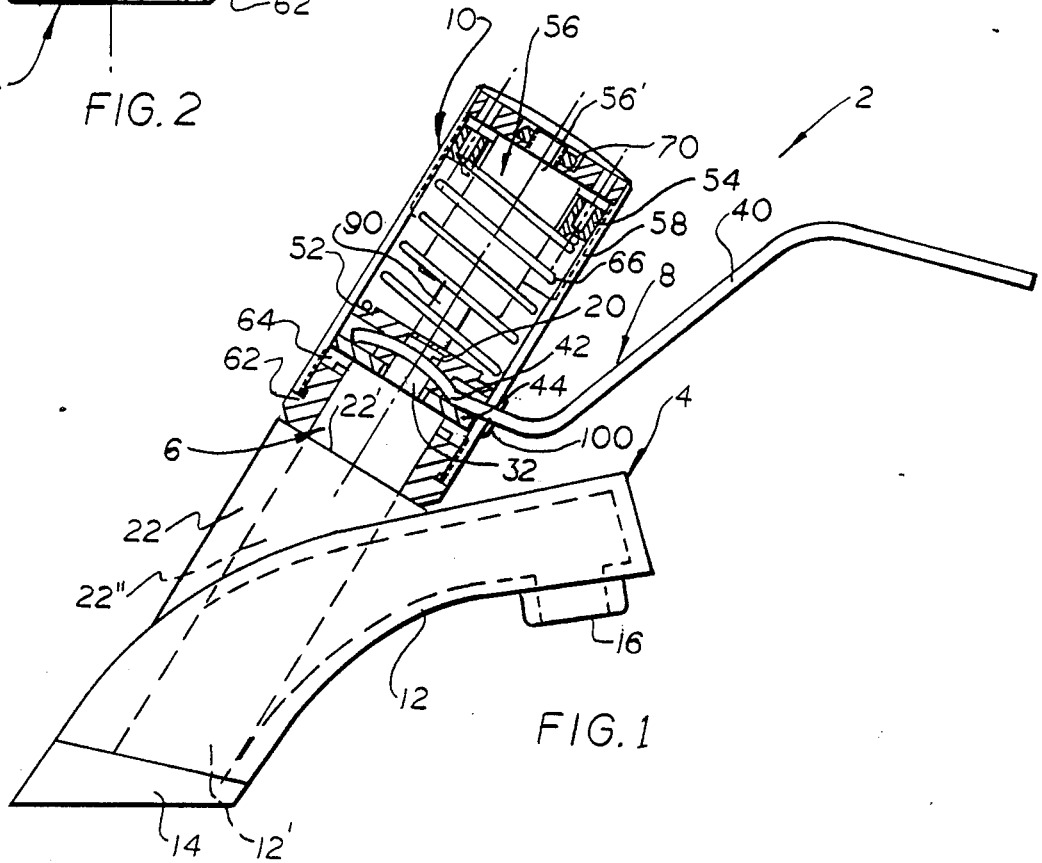

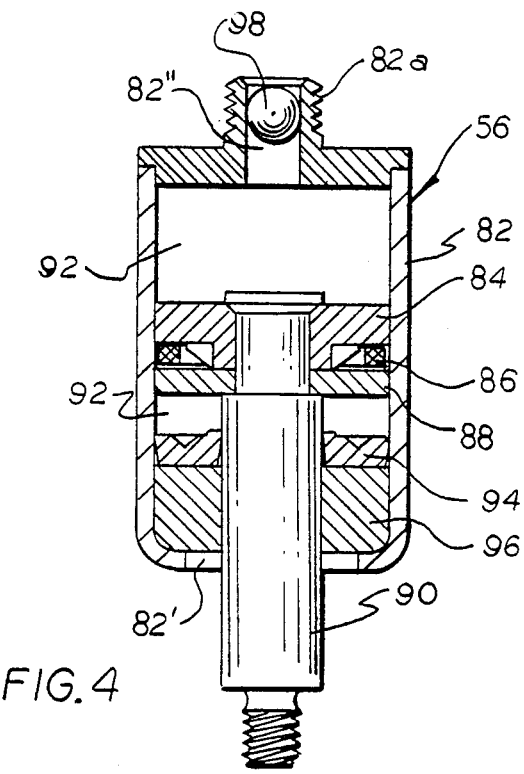
FIG. 4
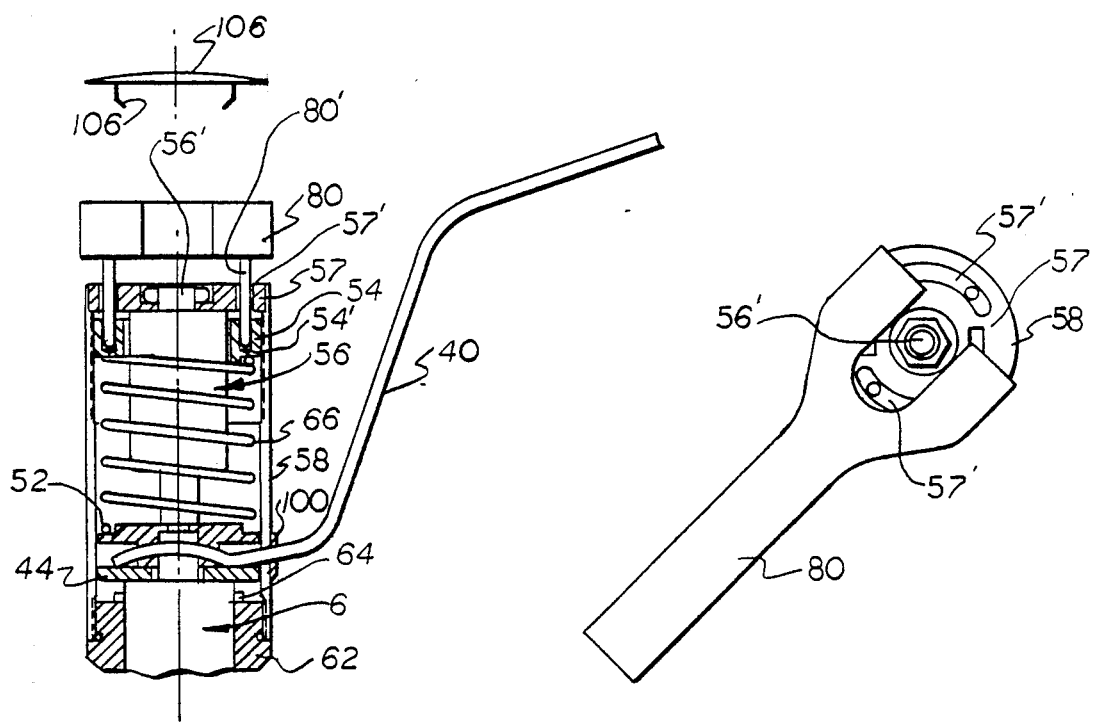
FIG. 5
FIG. 6

FAUCET ACTUATOR

BACKGROUND OF THE INVENTION

This invention relates to slow closing faucets, and more particularly to a slow closing faucet of the spool valve type.

Self closing faucets have been known for some time. These are of varying construction, all closing the valve after a time delay. Prior patents disclosing such faucets are U.S. Pat. Nos. 557,292; 570,306; 1,063,230; 1,580,494; 2,022,791; 2,528,822; 2,829,859; 2,963,259; 3,102,711; and 4,165,857.

SUMMARY OF THE INVENTION

This invention provides a self closing, single handle faucet enabling user adjustment of the water temperature and the flow rate discharged from the faucet using the single handle, i.e., lever, while allowing adjustable control of the rate of closing of the faucet by only an authorized party.

The slow close mechanism is capable of retrofitting to an existing single handle faucet with a spool-type valve, as well as to new faucets of such type. Its structure enables easy attachment followed by dependable operation at a desired preset closing rate. A particular closing rate can be easily reset by an authorized person, yet free from tampering by unauthorized persons. A single lever controls the water temperature and water flow rate at any of several preset valve closing rates. These flow variables can be achieved without interference with or by the other variables. The resulting product is aesthetically appealing.

BRIEF DESCRIPTION OF THE DRAWINGS

FIG. 1 is a side elevational partially sectioned view of the combination of this invention;

FIG. 2 is a sectional view of the upper portion of FIG. 1;

FIG. 3 is a sectional view taken on plane III—III of FIG. 2;

FIG. 4 is a sectional view of the hydraulic damper in FIGS. 1 and 2;

FIG. 5 is a sectional view comparable to FIG. 2 except including a special adjustment spanner wrench; and FIG. 6 is a top plan view of the subject matter of FIG. 5.

DESCRIPTION OF THE PREFERRED EMBODIMENT

Referring now specifically to the drawings, the complete assembly 2 there depicted includes a spigot subassembly 4, a mixing valve subassembly 6, a valve actuator subassembly 8 and a slow close subassembly 10.

Spigot subassembly 4 is of generally conventional construction, including an upwardly outwardly projecting faucet or spigot 12 having a base 14 for mounting it on a sink. Such spigot is hollow, including a water outlet 16 on the bottom of the upper outer end, and conventional hot and cold inlets at the base, leading to the hollow interior 12' which forms a passageway. Projecting upwardly from the faucet and forming an integral part thereof is a hollow valve support 22 having a flat annular outer surface 22'. The inner chamber 22'' of protrusion 22 is in alignment with and communicates directly with the lower portion of conduit 12' in faucet 12. Mixing valve subassembly 6 is located within this chamber 22'', extending down into the conduit 12' and projecting at its upper end from chamber 22'' and beyond flat surface 22' as indicated in FIG. 1. This mixing valve subassembly is a spool valve type as set forth in U.S. Pat. No. 4,495,969 incorporated by reference herein, or an equivalent spool valve. Subassembly 6 includes a valve stem 20 having a shaft portion 32 projecting upwardly from the main body of the valve, this shaft portion having a pair of flats 34 (FIG. 3) on opposite sides thereof. (See such components in said U.S. Pat. No. 4,495,969.) Rotation of this valve stem about its longitudinal axis causes the valve to allow controlled amounts of hot water and of cold water to enter and mix together in chamber 12', and flow to outlet 16. Reciprocation, i.e., rectilinear movement of the valve stem, causes the volume of water flow through chamber 12' to be varied. The user of the faucet directly governs these two variables using a single lever.

Valve actuator subassembly 8 includes an actuator lever 40 capable of rotating valve stem 20 and of shifting it rectilinearly, as will be described more fully hereinafter. Near the lower end of lever 40 is a pivot fulcrum offset or apex 42 which engages the upper surface of an annular fulcrum washer 44 just beneath the inner end of lever 40. The inner end of lever 40, as well as washer 44 and the upper protruding end of mixing valve subassembly 6 are all located within a cylindrical tubular housing or cover tube 58. This housing has internal threads at its lower end, threadably engaged onto a cylindrical mounting base 62. The lower end of mounting base 62 abuts flat surface 22' on the faucet projection, said base also surrounding the housing of mixing valve subassembly 6 (FIG. 1). Mounting base 62 is secured against protrusion 22 by an annular retaining clip 64 which lies in the top of base 62 and has an inner annular surface which engages the housing of mixing valve subassembly 6. This annular clip bites into the periphery of the valve housing to secure the base and the members mounted thereabove to the faucet. Washer 44 rests on the outer annular end of valve subassembly 6, having a central opening to receive valve stem 20 therethrough. Resting on washer 44 is a lower guide adapter 52 which has a smaller diameter lower neck and a larger diameter upper head. This head is secured between piston rod 90 and valve stem 20 to move rectilinearly therewith. The inner end of lever 40 is of forked construction, the bifurcated legs thereof protruding around the valve stem and engaging a pair of external flats on the neck of lower guide adapter or retainer 52 so that, when lever 40 is pivoted about the central axis of the valve stem, adapter 52 will also pivot therewith. This adapter has a central opening with internal flats matching those of outer flats 34 on valve stem 20 so that rotation of adapter 52 causes rotation of valve stem 20. Thus, the lower end of lever 40 is between underlying washer 44 and overlying guide adapter 52. This guide adapter also comprises a lower retainer for a compression coil spring 66 which has its lower end in engagement with retainer 52 and its upper end in engagement with upper adjustable retainer ring 54. Upper retainer 54 is an annular member having threads on its outer periphery in threaded engagement with corresponding threads on the inner surface of the upper end of tubular housing 58. At least two upwardly projecting cavities 54' spaced from each other are located in retainer 54 for receipt of the prongs of a spanner wrench 80 (FIGS. 5 and 6). Clockwise or counterclockwise movement of retainer 54 by the spanner wrench thus applies greater or lesser compression on spring 66 to set the rate of valve closing. Immediately above retainer 54 is a tube cap 57 press fitted into the upper outer end of housing 58 and rotational therewith. This tube cap 57 is connected to hydraulic damper subassembly 56 by a nut 56' which engages the center portion of the top surface of cap 57 and fits around and threadably engages the threaded nipple 82a protruding from the center of hydraulic damper subassembly 56 and through cap 57. A dress cover 106 having spring legs 106' is engageable with the arcuate openings 57' in tube cap 57 to cover the mechanism.

Hydraulic damper subassembly 56 comprises a tubular housing 82 containing an internal piston 84, a piston ring 86 and a washer 88, all retained on the inner end of a piston rod 90, the lower end of which extends through an opening 82' in housing 82. The piston, ring and washer are rectilinearly movable within housing 82 along with rod 90. An hydraulic fluid in chamber 92 can move slowly past the piston under compressive force of spring 66, from one side of the piston to the other within chamber 92. An annular seal 94 around the lower end of rod 90 prevents leakage of the fluid out of chamber 92. An annular guide 96 retains rod 90 in alignment. At the opposite, i.e., upper, end of the housing from which the rod extends is a passage 82" having a ball type seal 98 therein, e.g., to allow filling. This passage 82" is in protrusion 82a threaded on its exterior to receive nut 56' (FIG. 1). The lower extended end of rod 90 is also threaded to threadably engage within a threaded orifice in the upper end of spool valve stem 20.

Operation of the slow close mechanism desirably enables the user to immediately select the output water temperature and flow rate with one lever, and at a valve closing rate determined only by authorized personnel and adjustable to suit the situation. Depressing lever 40 with a downward force allows the operator to dispense water from the faucet for the predetermined period of time. That is, when lever 40 is depressed, its cammed pivot or fulcrum 42 on washer 44 provides the mechanical means necessary to lift lower guide adapter 52 and attached water faucet valve stem 20 to open position. Because both hydraulic damper subassembly 56 and compression spring 66 are attached to valve stem 20 and encapsulated by cover tube or housing 58, they are also lifted and compressed. Once compressed, the stored energy of compression spring 66 exerts force on the hydraulic damper subassembly, causing return to an extended or valve-closed state. The rate at which the water faucet valve closes depends upon the controlled metering of the hydraulic fluid contained in the hydraulic damper assembly and the spring rate of the compression spring. Thus, for a given hydraulic damper assembly, the speed for valve closure can be adjusted by inducing more or less compression force onto the spring. This adjustment is accomplished by removing dress cover 106, inserting the prongs 80' of spanner wrench 80 through top arcuate access slots 57' in cap 57 and into cavities 54' of underlying adjusting retainer ring 54, and rotating ring 54 either clockwise or counterclockwise relative to the rest of the assembly, to increase or decrease the speed of valve closure. The slow close mechanism does not allow tampering with this adjustment since the appropriate spanner wrench tool must be used.

The actuation lever also has the function allowing the user to adjust the temperature of the water being dispensed by rotating the lever either clockwise or counterclockwise for hotter or colder water. Between lever 40 and tube 58 in the arcuate slot 58' is a polymeric shroud 100. When lever 40 is pivoted clockwise or counterclockwise, the entire assembly pivots therewith, including shroud 100, housing 58 and mount 62. The actuation lever 40 translates rotational force to spool valve stem 20 by means of its engagement with lower guide adapter 52.

Assembly of the mechanism involves placing mounting base 62 on surface 22' of protruding valve housing 22 of the water faucet, and securing it in position by retaining clip 64. Washer 44 is then placed onto the water faucet valve stem 20. Lower guide adapter 52 is then placed onto washer 44. The hydraulic damper assembly piston rod 90 is threaded into water faucet valve stem 20 and secured against rotation with an adhesive. Compression spring 66 is placed over hydraulic damper subassembly 56 and seated onto a spring groove in lower guide adapter 52. The cover housing comprising the tube 58, the adjusting ring 54 and the tube cap 57 is then threaded onto mounting base 62. The hydraulic damper subassembly 56 is affixed to tube cap 57 by nut 56'. The bifurcated end of actuation lever 40 is inserted into an arcuate side slot in cover tube 58 and engaged onto lower guide adapter 52. A lever shroud 100 around lever 40 is then pressed into the cover tube entry slot 58'. The spring loaded prongs 106' of the dress cover are pressed into slots 57' provided in the top of the tube cap for final assembly.

Conceivably, the details of the novel construction, of which the preferred embodiment is set forth herein, could be altered to suit particular installations. Hence, the invention is intended to be limited only by the claims herein and the reasonably equivalent structures to those defined therein.

The embodiments of the invention in which an exclusive property or privilege is claimed are defined as follows:

1. A slow closing faucet assembly comprising:
   a faucet having hot and cold water inlets and an outlet;
   said faucet including a valve receiving protrusion;
   a spool valve subassembly in said faucet protrusion, capable of rectilinear movement for controlling the water flow volume through said faucet and capable of rotational movement for controlling the relative amounts of hot and cold water into said faucet;
   said spool valve having a valve stem extending therefrom and from said protrusion;
   a tubular housing subassembly attached to said protrusion, having a mounting base at its lower end on said protrusion, and a tube cap at its upper end;
   a hydraulic damper in said tubular housing, including an inner piston, an extending piston rod, and hydraulic fluid movable from one side of said piston to the other under a biasing force;
   said hydraulic damper being secured by said tube cap and having its extended piston rod attached to said valve stem;
   a compression coil spring around said hydraulic damper, in said tubular housing, extending between an upper retainer and a lower retainer;
   said upper retainer being threadably attached to said housing;
   said lower retainer being rectilinearly movable within said housing toward said upper retainer to compress said spring;

a lever having an end within said housing, said lever being engaged with said valve stem for rotation thereof allowing water temperature control, and operable on said lower retainer for moving said lower retainer toward said upper retainer for water flow rate control with said lever;

said upper retainer being rotationally adjustable to move it axially and thereby control compression of said spring; and said tube cap having openings therein allowing access to said upper retainer for adjustment.

2. The slow closing faucet assembly in claim 1 including spanner wrench cavities in said upper retainer, and arcuate slots in said tube cap aligned with said cavities for insertion of spanner wrench prongs through said slots into said cavities for said adjustment of said upper retainer.

3. A slow closing faucet assembly comprising:
a faucet having a valve receiving protrusion;
a spool valve subassembly in said faucet protrusion, capable of rectilinear movement for controlling water flow volume through said faucet and capable of rotational movement for controlling relative amounts of hot and cold water into said faucet;
said spool valve having a valve stem extending therefrom and from said protrusion;
a tubular housing subassembly attached to said protrusion by a mounting base at its lower end on said protrusion;
a hydraulic damper in said tubular housing, including an inner piston, an extending piston rod, and hydraulic fluid movable from one side of said piston to the other under a biasing force;
said hydraulic damper having its extended piston rod attached to said valve stem;
a spring in said tubular housing, extending between an upper retainer and a lower retainer;
said lower retainer being rectilinearly movable within said housing relative to said upper retainer to bias said spring and shift said hydraulic damper;
a lever having an end within said housing, said lever being engaged with said valve stem for rotation thereof allowing water temperature control, and operable on said lower retainer for moving said lower retainer relative to said upper retainer for water flow rate control; and
said upper retainer being adjustably movable relative to said housing to vary the bias on said spring and thereby alter the rate of spool valve closing.

4. The slow closing faucet assembly in claim 3 including spanner wrench prong-receiving cavities in said upper retainer for adjusting movement thereof by a spanner wrench.

5. The slow closing faucet assembly in claim 4 including a cap on said housing adjacent said upper retainer.

6. The slow closing faucet assembly in claim 5 wherein said cap includes arcuate slots aligned with said cavities for allowing access to said cavities through said cap by prongs of a spanner wrench.

7. The slow closing faucet assembly in claim 6 including a dress cover on said housing and over said cap, said dress cover having connector means for removably securing it to said housing.

8. The slow closing faucet assembly in claim 7 wherein said connector means comprises spring legs engageable with said arcuate slots.

9. A faucet slow close mechanism comprising a housing subassembly having means for attachment to a faucet, said faucet having a linearly movable valve for controlling flow therepast;

a spring in said housing subassembly for biasing said faucet valve toward closed position;

a hydraulic damper in said housing subassembly operably associated with said spring for resisting the biasing action of said spring and thereby slowing the movement of said valve toward closed position;

a control lever extending into said housing subassembly and having means for shifting said valve toward the open position while shifting said spring against its biasing force; and adjustment means for said spring to enable said biasing force to be varied to thereby adjust the rate of movement of said valve toward the closed position.

10. The faucet slow close mechanism in claim 9 wherein said spring is a compression spring trapped at its ends by a pair of retainer, one of said retainers being movable to vary the distance between said retainers and thereby the length and compression of said spring.

11. The faucet slow close mechanism in claim 10 wherein said spring extends around said hydraulic damper.

12. The faucet slow close mechanism in claim 10 wherein said one retainer is at the end of said spring furthest from said lever and the other retainer is on the end of said spring closest to said lever.

13. A faucet and faucet slow close mechanism comprising a faucet housing having inlets for hot and cold water and a common outlet;

a spool valve in said housing, said spool valve being rotational for controlling the relative flow of hot and cold water to said common outlet when said valve is rotated;

said valve being reciprocable in controlled amounts between fully closed and fully open positions;

said slow close mechanism comprising a housing subassembly having means for attachment to a faucet;

a spring in said housing subassembly for biasing said faucet valve toward closed position;

a hydraulic damper in said housing subassembly operably associated with said spring for resisting the closing action of said spring and thereby slowing the movement of said valve toward closed position;

a control lever extending into said housing subassembly and having means for shifting said valve toward open position while shifting said spring against its biasing force and shifting said hydraulic damper; and adjustment means for said spring to enable said biasing force to be varied to thereby adjust the rate of movement of said valve toward the closed position.

14. The faucet slow close mechanism in claim 13 wherein said spring is a compression spring trapped at its ends by a pair of retainers, one of said retainers being adjustably movable to vary the distance between said retainers and thereby the length and compression of said spring.

15. The faucet slow close mechanism in claim 14 wherein said spring extends around said hydraulic damper.

16. The faucet slow close mechanism in claim 14 wherein said one retainer is at the end of said spring furthest from said lever and the other retainer is on the end of said spring closest to said lever.

17. A slow closing attachment for a faucet assembly having hot and cold water inlets, a common outlet, and a spool valve which is rotational for controlling outlet water temperature and is reciprocable for controlling output flow rate, comprising:

a tubular housing having a mounting base at its lower end for attachment to the faucet;

a hydraulic damper in said tubular housing, including an inner piston, an extending piston rod, and hydraulic fluid movable from one side of said piston to the other under a biasing force;

said hydraulic damper having its extended piston rod attached to said valve stem;

a spring in said tubular housing, extending between an upper retainer and a lower retainer;

said lower retainer being rectilinearly movable within said housing relative to said upper retainer to bias said spring and shift said hydraulic damper;

a lever having an end within said housing, said lever being engaged with said valve stem for rotation thereof allowing water temperature control, and operable on said lower retainer for moving said lower retainer relative to said upper retainer for water flow rate control; and said upper retainer being adjustably movable relative to said housing to vary the bias on said spring and thereby alter the rate of spool valve closing.

18. The slow closing faucet assembly in claim 17 including spanner wrench prong-receiving cavities in said upper retainer for adjusting movement thereof by a spanner wrench.

19. The slow closing faucet assembly in claim 18 including a cap on said housing adjacent said upper retainer.

20. The slow closing faucet assembly in claim 19 wherein said cap includes arcuate slots aligned with said cavities for allowing access to said cavities through said cap by prongs of a spanner wrench.

21. An attachable slow close subassembly for attachment to a faucet having a valve which is rotational to control output water temperature, and rectilinearly movable to control output water flow rate, said subassembly comprising:

a mounting base;

a coil spring in said housing;

a pair of spring retainers at the ends of said coil spring including a lower retainer adjacent said valve and an upper retainer;

an actuation lever extending into said housing adjacent said lower retainer and engaging said valve stem, said lever being movable in an arc for rotating said valve stem and thereby controlling the relative inlet of hot and cold water;

said lever also being pivotally rockable to shift said valve stem rectilinearly to adjust the flow rate of water through said mechanism;

said upper spring retainer being an annulus around said hydraulic damper and threadably engaged with said housing; and means on said annulus for engagement by a tool for adjusting the distance between retainers and thereby the amount of compression on said coil spring for controlling the rate of return of said valve toward the closed position.

* * * * *